(12) United States Patent
Nishikata et al.

(10) Patent No.: US 10,801,817 B2
(45) Date of Patent: Oct. 13, 2020

(54) METHOD OF IRRADIATING ELECTROMAGNETIC PULSE AND ELECTROMAGNETIC PULSE IRRADIATING SYSTEM

(71) Applicant: MITSUBISHI HEAVY INDUSTRIES, LTD., Tokyo (JP)

(72) Inventors: Shingo Nishikata, Tokyo (JP); Yoshikatsu Kuroda, Tokyo (JP); Hiroshi Ikebuchi, Tokyo (JP); Koichi Hamamoto, Tokyo (JP); Tomoya Morioka, Tokyo (JP); Atsushi Ochiai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 88 days.

(21) Appl. No.: 15/564,130

(22) PCT Filed: Apr. 14, 2016

(86) PCT No.: PCT/JP2016/061998
§ 371 (c)(1),
(2) Date: Oct. 3, 2017

(87) PCT Pub. No.: WO2017/002427
PCT Pub. Date: Jan. 5, 2017

(65) Prior Publication Data
US 2018/0080747 A1    Mar. 22, 2018

(30) Foreign Application Priority Data

Jun. 30, 2015    (JP) .................................. 2015-131595

(51) Int. Cl.
*F41H 13/00* (2006.01)
*F41H 11/02* (2006.01)
(Continued)

(52) U.S. Cl.
CPC ......... *F41H 13/0093* (2013.01); *F41H 11/02* (2013.01); *F41H 13/005* (2013.01);
(Continued)

(58) Field of Classification Search
None
See application file for complete search history.

(56) References Cited

U.S. PATENT DOCUMENTS 5,198,607 A * 3/1993 Livingston .......... F41H 13/0062
89/1.11
5,747,720 A * 5/1998 Schnurr .............. F41H 13/0062
250/347
(Continued)

FOREIGN PATENT DOCUMENTS

DE    10 2007 049 436    4/2009
EP    1 746 381    1/2007
(Continued)

OTHER PUBLICATIONS

Koechner et al. "Solid-State Lasers: A Graduate Text" (1993), 127-141.*
(Continued)

*Primary Examiner* — James Choi
(74) *Attorney, Agent, or Firm* — Wenderoth, Lind & Ponack, L.L.P.

(57) ABSTRACT

A method of irradiating an electromagnetic pulse includes specifying a position of a target having electronic equipment; setting the light-condensing point based on the position of the target; and condensing the laser beam to generate plasma in the light-condensing point such that the electromagnetic pulse generated from the plasma is irradiated to the electronic equipment. In this way, a method and system for irradiating an electromagnetic pulse are realized which can (Continued)

irradiate the electromagnetic pulse of a large output while restraining diffusion of the electromagnetic pulse.

7 Claims, 6 Drawing Sheets

(51) Int. Cl.
*H05H 1/24* (2006.01)
*H01S 3/10* (2006.01)
*H01S 3/00* (2006.01)

(52) U.S. Cl.
CPC .................. *H01S 3/00* (2013.01); *H01S 3/10* (2013.01); *H05H 1/24* (2013.01)

(56) References Cited

U.S. PATENT DOCUMENTS

| | | | |
|---|---|---|---|
| 7,255,062 | B1 | 8/2007 | Higman |
| 7,970,023 | B2 | 6/2011 | Protz et al. |
| 8,981,261 | B1 | 3/2015 | Tillotson |
| 9,805,829 | B2 | 10/2017 | Sekine et al. |
| 2001/0011712 | A1* | 8/2001 | Castenmiller ....... G03F 7/70716 250/548 |
| 2005/0068999 | A1 | 3/2005 | Momiuchi et al. |
| 2007/0051233 | A1 | 3/2007 | Duge |
| 2007/0144392 | A1 | 6/2007 | Wood et al. |
| 2008/0197299 | A1* | 8/2008 | Hoshino ............... H01S 3/2383 250/504 R |
| 2009/0084252 | A1 | 4/2009 | Marquis et al. |
| 2009/0097508 | A1 | 4/2009 | Protz et al. |
| 2010/0018428 | A1 | 1/2010 | Regebro |
| 2010/0127191 | A1* | 5/2010 | Partlo ..................... H05G 2/003 250/504 R |
| 2013/0033695 | A1* | 2/2013 | Kong ................. F41H 13/0062 356/28 |
| 2015/0270019 | A1 | 9/2015 | Sekine et al. |
| 2016/0097616 | A1* | 4/2016 | Weigold .............. F41H 13/0062 250/396 R |
| 2018/0092195 | A1 | 3/2018 | Nishikata et al. |

FOREIGN PATENT DOCUMENTS

| | | | |
|---|---|---|---|
| EP | 2 489 399 | | 8/2012 |
| EP | 2 911 153 | | 8/2015 |
| JP | 5-223499 | | 8/1993 |
| JP | 10-59297 | | 3/1998 |
| JP | 2000-65497 | | 3/2000 |
| JP | 2003-233339 | | 8/2003 |
| JP | 2006-226608 | | 8/2006 |
| JP | 2007-206588 | | 8/2007 |
| JP | 2012208370 A | * | 10/2012 |
| WO | 2014/061562 | | 4/2014 |

OTHER PUBLICATIONS https://flynn.fandom.com/wiki/EMP_missile_(weapon)?direction=prev&oldid=4136 (Year: 2014).*
Strieber et al. "Warday," (Holt, Rinehart and Winston, 1984) (Year: 1984).*
Extended European Search Report dated Mar. 6, 2018 in European Patent Application No. 16817537.0.
International Search Report dated Jul. 12, 2016 in International Application No. PCT/JP2016/061998.
International Preliminary Report on Patentability dated Jan. 11, 2018 in International Application No. PCT/JP2016/061998.
International Search Report dated Jul. 12, 2016 in International Application No. PCT/JP2016/062002.
International Preliminary Report on Patentability dated Nov. 2, 2017 in International Application No. PCT/JP2016/062002.
Extended European Search Report dated Mar. 14, 2018 in European Patent Application No. 16817538.8.
Office Action dated Oct. 22, 2018 from U.S. Appl. No. 15/562,642 including double patenting rejections on pp. 2-4.

* cited by examiner

METHOD OF IRRADIATING ELECTROMAGNETIC PULSE AND ELECTROMAGNETIC PULSE IRRADIATING SYSTEM

TECHNICAL FIELD

The present invention relates to a method of irradiating an electromagnetic pulse and an electromagnetic pulse irradiating system.

BACKGROUND ART

When receiving a strong electromagnetic pulse, electronic equipment cannot operate normally, and in some cases, is destroyed. EMP (electromagnetic pulse) weapon uses such a phenomenon, and generates the strong electromagnetic pulse by any method to irradiate to a target so as to obstruct the operation of electronic equipment or to destroy the electronic equipment.

The EMP weapon is mainly classified into two types, one of which irradiates the electromagnetic pulse from a remote place to the target, and the other of which approaches the target and irradiates the electromagnetic pulse from the neighborhood of the target to the target. The EMP weapon which irradiates the electromagnetic pulse from the remote place to the target is installed on the ground or is loaded on a large-sized vehicle such as an automobile and a ship. On the other hand, the EMP weapon which irradiates the electromagnetic pulse from the neighborhood of the target is dropped from an aircraft and so on, or flies by its own ability to approach the target.

However, according to the consideration of the inventors, there are problems to be overcome in these EMP weapons. The EMP weapon which irradiates the electromagnetic pulse from the remote place to the target does not almost undergo the constraints of size and weight and is easy to realize the generation of electromagnetic pulse of a large output. On the other hand, since such an EMP weapon is required to irradiate the electromagnetic pulse to the target very far from the EMP weapon, the electromagnetic pulse is diffused while being propagated. As a result, the strength of the electromagnetic pulse declines and there is a case that a desired result cannot be achieved. Also, when the electromagnetic pulse diffuses, there is a case that any influence is given a wide range around the target. This is not desirable. On the other hand, the EMP weapon which irradiates the electromagnetic pulse from the neighborhood of the target is required to be carried by an aircraft and so on, or to fly by its own ability. Therefore, there are constraints of the size and the weight. This means that the generation of the electromagnetic pulse of a large output is difficult.

It is reported that the research which uses a laser as a weapon has come to practical use in U.S., and a video in which an unmanned drone is shot down by the irradiation of the laser is opened to the public. When the object to be shot down is a manned aircraft, a pilot is exposed to a risk. In case of defense, however, it is enough to cause a malfunction of the electronic equipment of the aircraft so that a strategy cannot continue to be operated.

From such a background, the realization of a method and system of irradiating an electromagnetic pulse is demanded in which the electromagnetic pulse of a large output can be irradiated while restraining the diffusion of electromagnetic pulse.

As the technique related to the present invention, JP 2007-206588A discloses an aerial visible image forming apparatus that collects the laser beam to generate plasma, and pictures a character, a visible image of an image and so on by using visible light outputted from the plasma in the air.

CITATION LIST

[Patent Literature 1] JP 2007-206588A

SUMMARY OF THE INVENTION

Therefore, one object of the present invention is to realize a method and system of irradiating an electromagnetic pulse that can irradiate an electromagnetic pulse of a large output while restraining the diffusion of electromagnetic pulse.

Other objects and a new feature of the present invention could be understood from the disclosure of this Specification and drawings.

In one aspect of the present invention, a method of irradiating an electromagnetic pulse includes specifying a position of a target having an electronic equipment; setting a light-condensing point based on the position of the target; and condensing a laser beam on the light-condensing point to generate plasma in the light-condensing point so that the electromagnetic pulse generated from the plasma is irradiated to the electronic equipment.

In one embodiment, the laser beams generated by a plurality of laser devices are condensed on the light-condensing point.

In one embodiment, the setting includes setting a plurality of the light-condensing points based on the position of the target at a time point, and the laser beams may be respectively condensed on the plurality of light-condensing points.

In one embodiment, the setting includes setting an orbit based on the position of the target at a time point, and setting a plurality of the light-condensing points on the orbit. The laser beam may be sequentially condensed on the plurality of light-condensing points.

In one embodiment, the light-condensing point may be set to a position which is a neighborhood of the position of the target and is different from the position of the target.

It is desirable that the laser beam is generated by a pulse laser which carries out pulse oscillation.

In another aspect of the present invention, an electromagnetic pulse irradiating system includes a target detecting apparatus configured to specify a position of a target having an electronic equipment; and a laser system configured to set a light-condensing point based on the position of the target, and condense the laser beam on the light-condensing point to generate plasma in the light-condensing point so that the electromagnetic pulse generated from the plasma is irradiated to the electronic equipment.

In one embodiment, the laser system has a plurality of laser devices configured to generate the laser beams, and the laser beams generated by the plurality of laser devices may be condensed on the light-condensing points, respectively.

In one embodiment, the laser system may be configured to set a plurality of the light-condensing points based on the position of the target at a time point, and condense the laser beams on the plurality of light-condensing points, respectively.

In one embodiment, the laser system may be configured to set an orbit based on the position of the target at a time point, and set a plurality of the light-condensing points on the orbit, and condense sequentially the laser beam on the set light-condensing points.

In one embodiment, the laser system may be set the light-condensing point to a position which is in a neighborhood of the position of the target and is different from the position of the target.

It is desirable that the laser system generates the laser beam by a pulse laser which carries out pulse oscillation.

According to the present invention, the method and system of irradiating an electromagnetic pulse can be realized in which the electromagnetic pulse of a large output can be irradiated while restraining the diffusion of electromagnetic pulse.

DESCRIPTION OF THE EMBODIMENTS

First Embodiment

Figure 1:
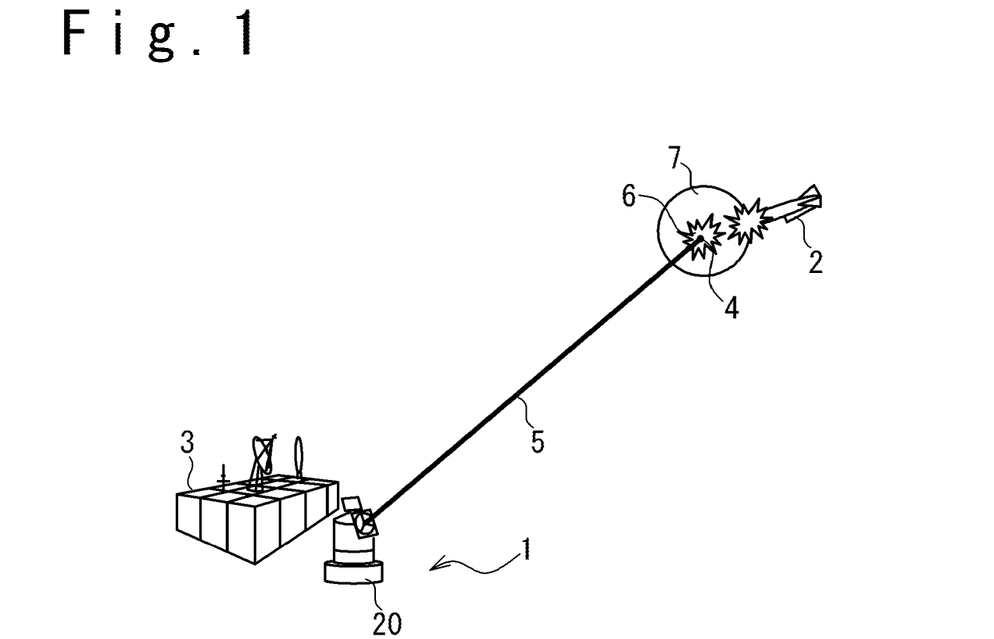
FIG. 1 is a conceptual diagram showing an example of an electromagnetic pulse irradiating system of a first embodiment.

FIG. 1 is a conceptual diagram showing an example of an electromagnetic pulse irradiating system 1 according to a first embodiment of the present invention. When a target 2 loaded with an electronic equipment approaches a protection object 3 and it is determined that the target 2 is a threat to the protection object 3, the electromagnetic pulse irradiating system 1 in the present embodiment irradiates an electromagnetic pulse to the target 2 to neutralize the target 2. For example, as the target 2, flying objects such as an aircraft and a missile are raised. As described below in detail, the electromagnetic pulse irradiating system 1 of the present embodiment adopts the configuration to condense a laser beam 5 to the target 2 and light-condensing points 4 set to a position in the neighborhood of the target 2 so as to generate plasma 6 in the light-condensing point 4 and to irradiate an electromagnetic pulse generated with the generation of plasma 6 to the target 2. A reference numeral 7 in FIG. 1 shows a region where the electromagnetic pulse having the strength enough to neutralize the target 2 is generated.

Figure 2:
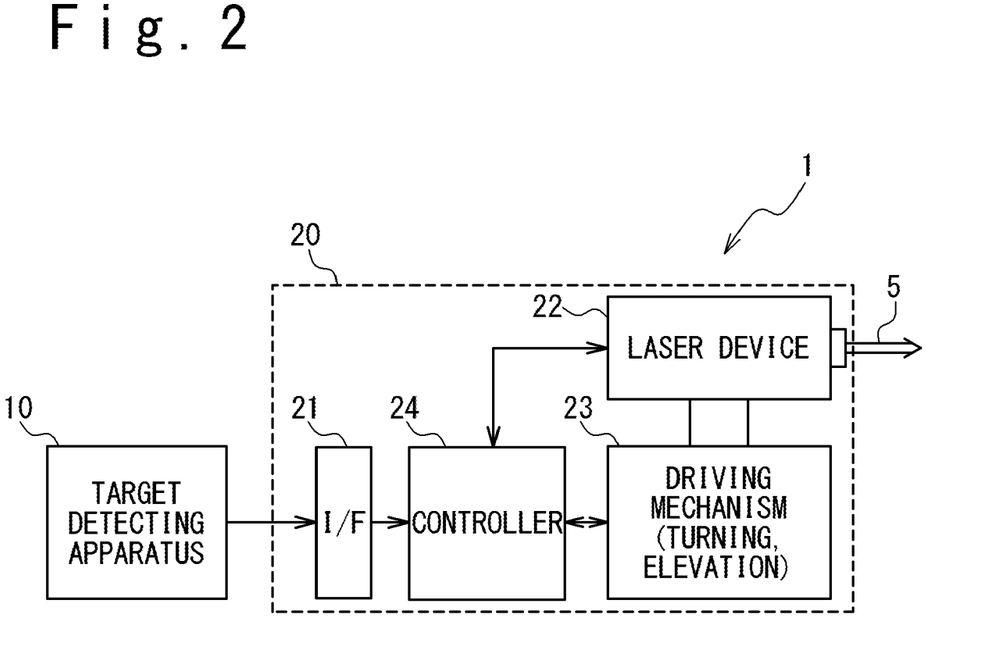
FIG. 2 is a block diagram showing an example of the configuration of the electromagnetic pulse irradiating system according to the first embodiment.

FIG. 2 is a block diagram showing an example of the configuration of the electromagnetic pulse irradiating system 1 of the present embodiment. The electromagnetic pulse irradiating system 1 of the present embodiment has a target detecting apparatus 10 and a laser system 20. The target detecting apparatus 10 is an apparatus that searches the target 2 to identify the position of the target. The target detecting apparatus 10 transmits data about the target 2, e.g. target detection data showing a position, a speed, an altitude and so on of the target, to the laser system 20, when detecting the target 2. For example, a laser radar can be used as the target detecting apparatus 10.

The laser system 20 is configured to set a light-condensing point 4 to the target 2 or a position in the neighborhood of the target 2 in response to the target detection data received from the target detecting apparatus 10, and condense the laser beam 5 to the set light-condensing point 4. In detail, the laser system 20 has an interface 21, a laser device 22, a driving mechanism 23, and a controller 24.

The interface 21 receives the target detection data from the target detecting apparatus 10 and transfers it to the controller 24.

The laser device 22 generates a laser beam 5. In the present embodiment, the laser device 22 is configured as a pulse laser that carries out pulse oscillation, and the generated laser beam 5 is a pulse laser beam. The reason why the pulse laser is used for the laser device 22 is to facilitate the plasma generation on the light-condensing point 4, i.e. the generation of electromagnetic pulse. As described above, the electromagnetic pulse irradiating system 1 of the present embodiment adopts the configuration in which plasma 6 is generated on the light-condensing point 4, and the electromagnetic pulse generated with the generation of plasma 6 is irradiated to the target 2. To generate the plasma 6 on the light-condensing point 4, the electric field strength on the light-condensing point 4 needs to be increased more than the breakdown electric field strength in the atmosphere. The pulse laser is suitable for the increase of the peak output of the laser beam, i.e. the spontaneous electric field strength. Therefore, it is desirable to use a pulse laser as the laser device 22 for the generation of plasma. In the laser device 22, a rod laser may be used to generate the pulse laser beam that has, for example, the laser wavelength of 1.06 μm, the pulse width of 10 ns, and the pulse energy is 0.1 J. Note that if it is possible to generate the plasma, a laser that oscillates a continuation wave may be used as the laser device 22. In this case, a continuation wave laser beam is generated as the laser beam 5.

A driving mechanism 23 is a mechanism to drive the laser device 22 to turn the optical axis of the laser device 22 to a desired direction (that is, a direction to which the laser beam 5 is irradiated). The driving mechanism 23 controls the direction of the laser device 22 so that an elevation angle (an angle between a horizontal plane and the optical axis) and a turning angle (an angle between a predetermined direction on a plane and an optical axis projected on the plane) of the laser device 22 are set to command values issued from the controller 24.

The controller 24 controls the laser device 22 and the driving mechanism 23 so that the laser beam 5 is condensed on the light-condensing point 4 as a desired position. In detail, the controller 24 sets the position of light-condensing point 4 based on the target detection data received from the target detecting apparatus 10. Furthermore, the controller 24 controls the driving mechanism 23 so that the laser beam 5 is irradiated for the light-condensing point 4 (that is, the optical axis of the laser device 22 passes through the light-condensing point 4), and controls the focal length of the laser device 22 (the focal length of an optical system of the laser device 22) so that the laser beam 5 is condensed on the light-condensing point 4.

Figure 3:
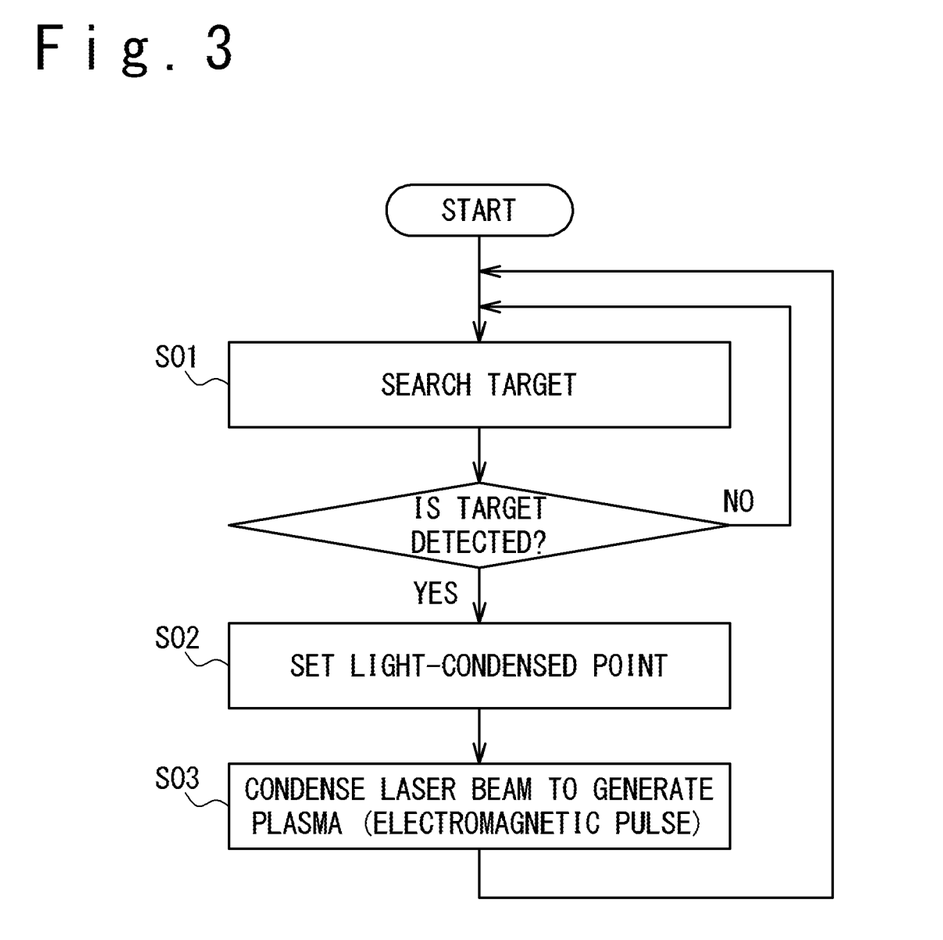
FIG. 3 is a flow chart showing an example of the operation of the electromagnetic pulse irradiating system according to the first embodiment.

FIG. 3 is a flow chart showing an example of the operation of the electromagnetic pulse irradiating system 1 of the present embodiment. By the target detecting apparatus 10, the search of the target 2 in a predetermined search region (for example, a region which contains the protection object 3) is carried out (Step S01). When detecting the target 2 through the search, the target detecting apparatus 10 transmits data of the target 2, e.g. the target detection data indicating the position, speed and so on of the target to the laser system 20.

Moreover, the position of light-condensing point 4 is set by the controller 24 of the laser system 20 (Step S02). The setting of the position of light-condensing point 4 is carried out based on the target detection data. In the present embodiment, the position of light-condensing point 4 is set based on the position of the target 2 specified by the target detection data. In one embodiment, the position of light-condensing point 4 may be set to the position of the target 2 specified by the target detection data or a position in the neighborhood of the target 2. In another embodiment, a prediction position of the target 2 when the laser beam 5 is irradiated may be calculated based on the position and velocity of the target 2 specified by the target detection data, and the position of light-condensing point 4 may be set to the calculated prediction position or a position in the neighborhood of the calculated prediction position. Various embodiments of the setting of the position of the light-condensing point 4 will be described later in detail.

Moreover, the laser beam 5 is irradiated so as to be condensed on the light-condensing point 4 (Step S03). In detail, the direction of the optical axis of the laser device 22 is controlled by the driving mechanism 23 so that the laser beam 5 passes through the light-condensing point 4. Moreover, the focal length of the laser device 22 is controlled. When the control of the direction of the optical axis of the laser device 22 and the focal length completes, the laser device 22 irradiates the laser beam 5 under the control by the controller 24.

Figure 4:
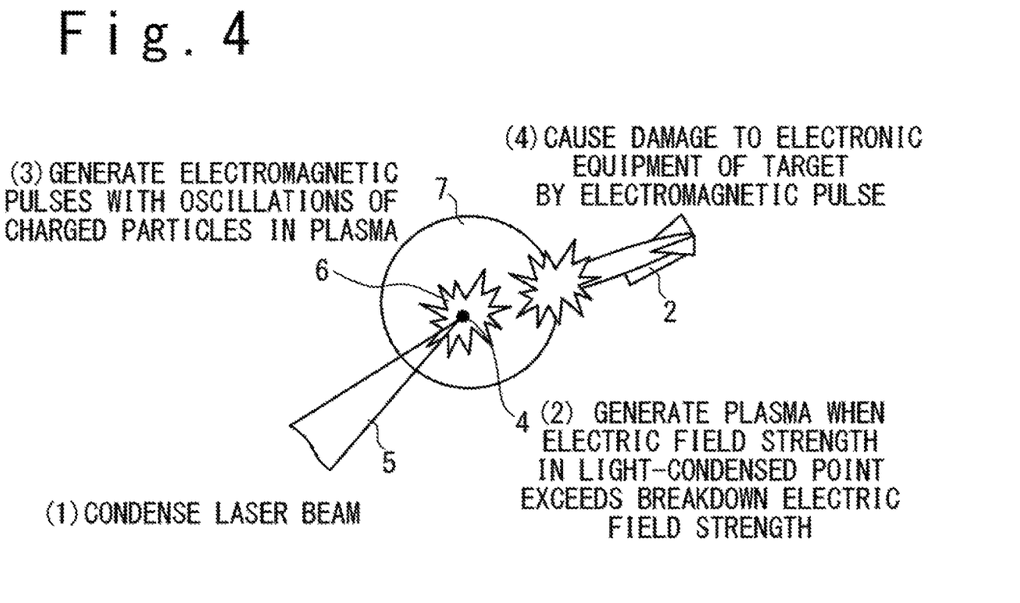
FIG. 4 is a diagram conceptually showing the generation of electromagnetic pulses by using a laser beam in the first embodiment.

FIG. 4 is a diagram showing the generation of electromagnetic pulse by using the laser beam 5. As illustrated in FIG. 4, the laser beam 5 is condensed on the light-condensing point 4 ((1) of FIG. 4), and the plasma 6 is generated in the light-condensing point 4 ((2) of FIG. 4) when the electric field strength exceeds a breakdown electric field strength in the atmosphere at the light-condensing point 4. Note that the generation of plasma 6 is facilitated by using the pulse laser beam generated by the pulse oscillation as the laser beam 5, as described above. When the plasma 6 is generated, the electromagnetic pulse (EMP) is generated by the vibration of charged particles in the plasma 6 ((3) of FIG. 4). When the electromagnetic pulse having an enough strength is irradiated to the electronic equipment loaded on the target 2, the electronic equipment malfunctions or is damaged ((4) of FIG. 4). In FIG. 4, the reference numeral 7 shows a region where the electromagnetic pulse having the effective strength is generated.

The search of of the target 2 is continuously carried out as far as the electromagnetic pulse irradiating system 1 operates. Every time the target 2 is detected, the setting of the position of light-condensing point 4 and the irradiation of the laser beam 5 are carried out.

One of the advantages of the electromagnetic pulse irradiating system 1 of the present embodiment is in the point that the diffusion of the electromagnetic pulse can be restrained. Because the laser beam 5 has high straightness, the problem of diffusion does not happen to the laser beam 5. Because the electromagnetic pulse is generated in the neighborhood of the target 2 by the laser beam 5 having such nature, the electromagnetic pulse irradiating system 1 of the present embodiment can restrain the diffusion of the electromagnetic pulse.

On the other hand, the electromagnetic pulse irradiating system 1 of the present embodiment is suitable for the generation of electromagnetic pulse of a large output. In the electromagnetic pulse irradiating system 1, because the laser device 22 that generates the laser beam 5 may be in a place apart away from the target 2, the laser device 22 of the large output can be used. By using the laser device 22 of the large output, the electromagnetic pulse irradiating system 1 of the present embodiment can generate the electromagnetic pulse of the large output.

Second Embodiment

Figure 5:
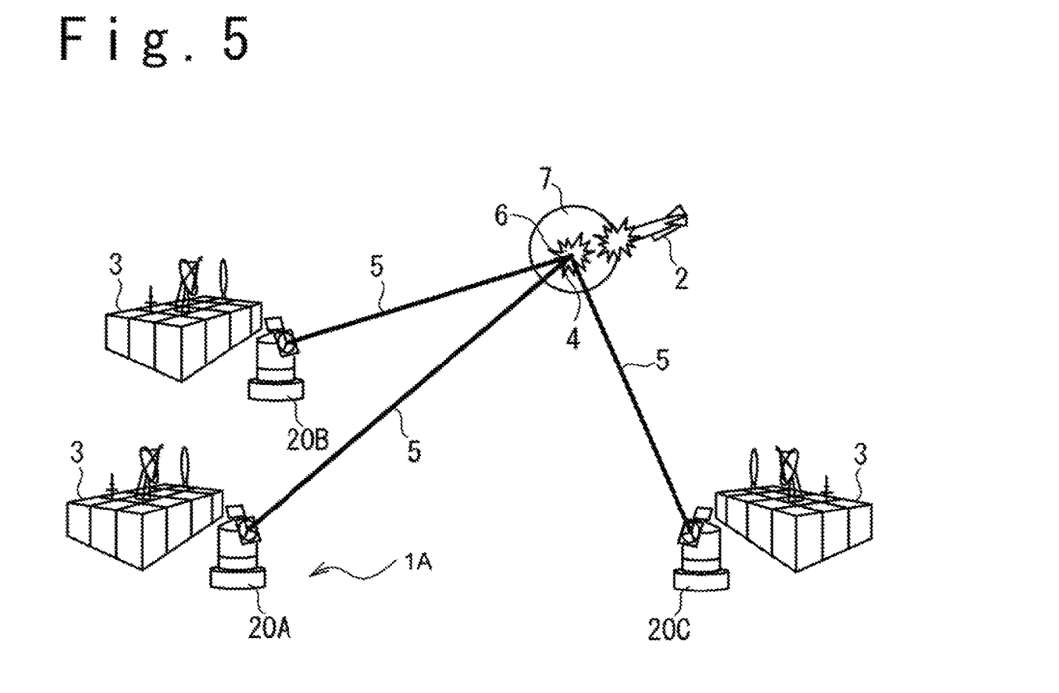
FIG. 5 is a conceptual diagram showing an example of the electromagnetic pulse irradiating system of a second embodiment.

FIG. 5 is a conceptual diagram showing an example of the electromagnetic pulse irradiating system 1A according to a second embodiment of the present invention. The electromagnetic pulse irradiating system 1A of the second embodiment is configured to condense the laser beams 5 generated from a plurality of laser devices on the light-condensing point 4.

Figure 6:
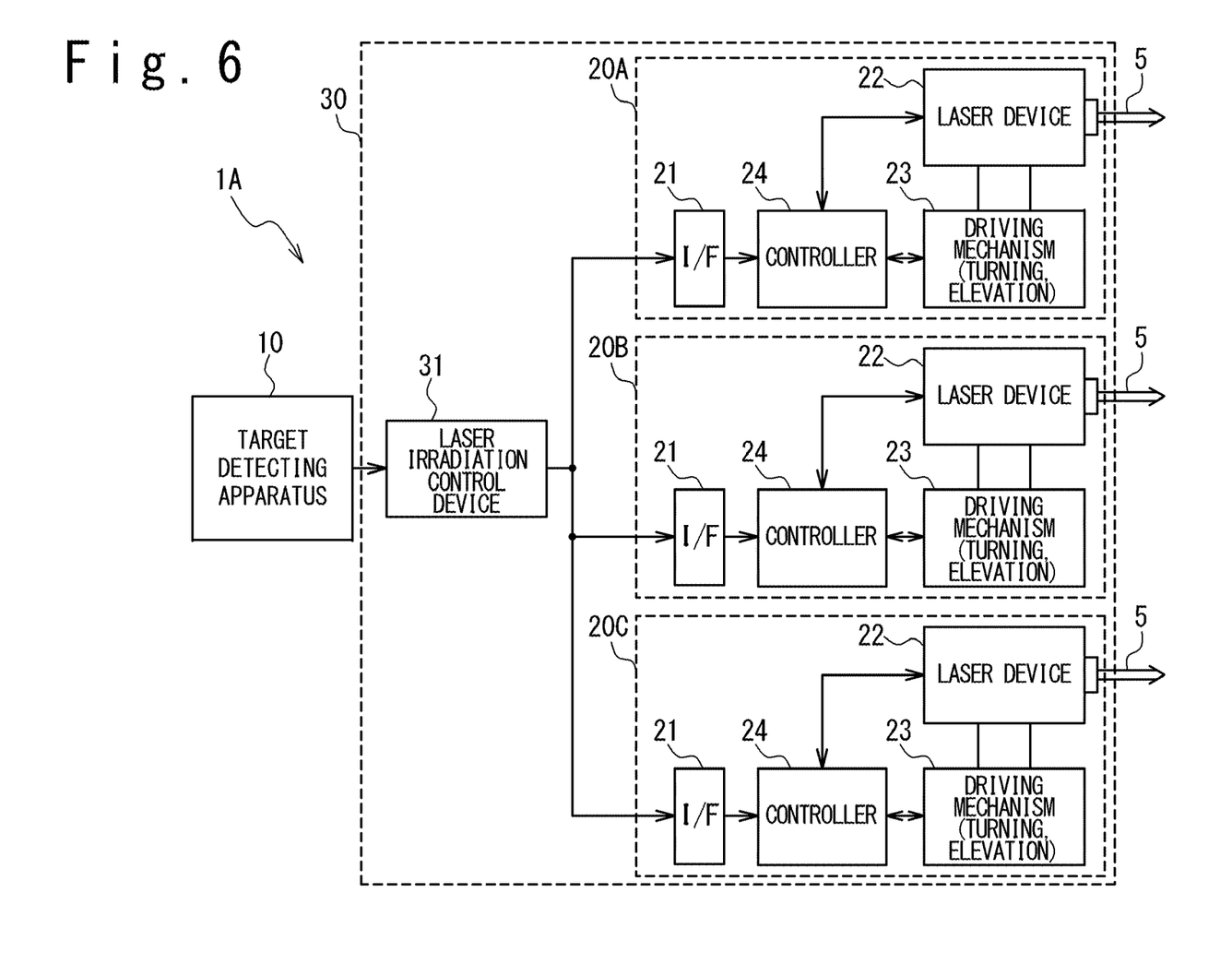
FIG. 6 is a block diagram showing an example of the configuration of the electromagnetic pulse irradiating system of the second embodiment.

FIG. 6 is a block diagram showing an example of the configuration of the electromagnetic pulse irradiating system 1A of the second embodiment. The electromagnetic pulse irradiating system 1A of the present embodiment has the target detecting apparatus 10 and the laser system 30. When searching the target 2 and detecting the target 2 through the search, the target detecting apparatus 10 transmits data of the target 2, e.g. the target detection data indicating a position, speed and so on of the target 2 to the laser system 20. For example, a laser radar can be used as the target detecting apparatus 10.

The laser system 30 sets the light-condensing point 4 based on the target detection data received from the target detecting apparatus 10, and condenses the laser beams 5 on the set light-condensing point 4. In detail, the laser system 30 has a laser irradiation control device 31, and subsystems 20A to 20C.

The laser irradiation control device 31 sets the position of light-condensing point 4 based on the target detection data received from the target detecting apparatus 10, and moreover, transmits a laser irradiation command to each of the subsystems 20A to 20C to instruct each subsystem to irradiate the laser beam 5 so that the laser beams 5 are condensed on the set light-condensing point 4.

Each of the subsystems 20A to 20C has the same configuration as the laser system 20 in the first embodiment. More specifically, each of the subsystems 20A to 20C has the interface 21, the laser device 22, the driving mechanism 23 and the controller 24.

The interface 21 receives the laser irradiation command from the laser irradiation control device 31 and transfers it to the controller 24. The laser device 22 generates the laser beam 5 to be condensed on the light-condensing point 4. Like the first embodiment, the laser device 22 is configured as the pulse laser that carries out the pulse oscillation. The driving mechanism 23 drives the laser device 22 to turn the optical axis of the laser device 22 to the desired direction (that is, the direction for the laser beam 5 to be irradiated). The controller 24 controls the laser device 22 and the driving mechanism 23 such that the laser beam 5 is condensed on the light-condensing point 4 in the position instructed by the laser irradiation command. The controller 24 controls the driving mechanism 23 to turn the optical axis of the laser device 22 to the direction such that the laser beam 5 passes through the light-condensing point 4, and controls the focal length of the laser device 22.

The operation of the electromagnetic pulse irradiating system 1A of the second embodiment is similar to that of the electromagnetic pulse irradiating system 1 in the first embodiment, excluding that the laser beams 5 irradiated from the plurality of laser devices 22 are condensed on the light-condensing point 4.

More specifically, the search of the target 2 is carried out in a predetermined monitor region (for example, a region containing the protection object 3) by the target detecting apparatus 10, and when the target 2 is detected by the search, the target detection data is transmitted to the laser system 30 from the target detecting apparatus 10.

Moreover, the position of light-condensing point 4 is set by the laser irradiation control device 31. The setting of the position of light-condensing point 4 is carried out based on the target detection data. In one embodiment, the position of light-condensing point 4 may be set to the position of the target 2 or a position in the neighborhood of the position of the target specified by the target detection data. Also, in another embodiment, a prediction position of the target 2 at a time point when the laser beam 5 is to be irradiated is calculated based on the position and speed of the target 2 specified in the target detection data, and the position of light-condensing point 4 may be set to the calculated prediction position or a position in the neighborhood of the prediction position. The laser irradiation control device 31 transmits the laser irradiation command to each of the subsystems 20A to 20C to instruct each subsystem 20A to 20C to irradiate the laser beam 5 so that the laser beams 5 are condensed on the set light-condensing point 4.

Moreover, the laser beam 5 is irradiated from each of the subsystems 20A to 20C so that the laser beams 5 are condensed on the light-condensing point 4. Each of the subsystems 20A to 20C irradiates the laser beam 5 so that the laser beams 5 are condensed on the light-condensing point 4 specified by the laser irradiation command. In each of the subsystems 20A to 20C, the direction of the optical axis of the laser device 22 is controlled by the driving mechanism 23 so that the laser beam 5 passes through the light-condensing point 4. Moreover, the focal length of the laser device 22 is controlled. When the controls of the direction of the optical axis of the laser device 22 and the focal length of the laser device 22 are completed, the laser device 22 irradiates the laser beam 5.

Figure 7:
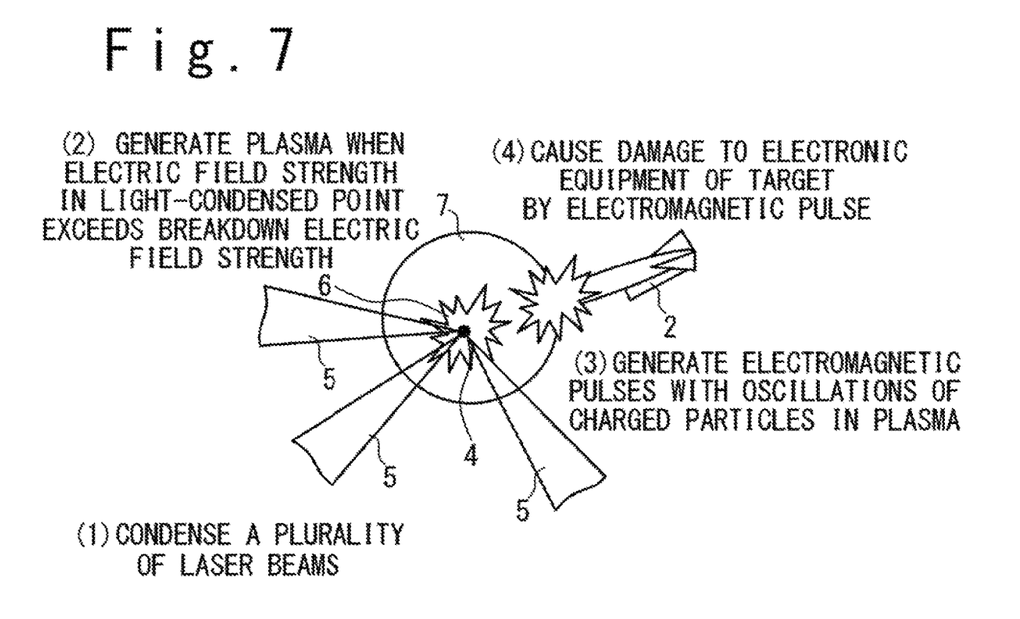
FIG. 7 is a diagram conceptually showing the generation of electromagnetic pulses by using a laser beam in the second embodiment.

As illustrated in FIG. 7, the laser beams 5 are condensed on the light-condensing point 4 ((1) of FIG. 7). When the electric field strength in the light-condensing point 4 exceeds breakdown electric field strength of the atmosphere, the plasma 6 is generated on the light-condensing point 4 ((2) of FIG. 7). When the plasma 6 is generated, the electromagnetic pulse (EMP) is generated through the vibration of the charged particles in the plasma 6 ((3) of FIG. 7). When the electromagnetic pulse having enough strength is irradiated to the electronic equipment loaded on the target 2, the electronic equipment malfunctions or is damaged ((4) of FIG. 7).

The electromagnetic pulse irradiating system 1A of the second embodiment can irradiates the electromagnetic pulse of a large output to the target 2 while restraining the diffusion of the electromagnetic pulse, like the electromagnetic pulse irradiating system 1 in the first embodiment.

In addition, the electromagnetic pulse irradiating system 1A of the second embodiment in which the laser beams 5 generated by the plurality of laser devices 22 are condensed on the light-condensing point 4 is suitable for a compact size of laser device 22. In the electromagnetic pulse irradiating system 1A of the present embodiment, the output of each laser beam 5 can be made small since the plurality of laser devices 22 are used. This means that it is possible to miniaturize each laser device 22. By miniaturizing each laser device 22, each of the subsystems 20A to 20C can be loaded on a moving vehicle (e.g. automobile and ship). Thus, this contributes to improvement of the operability.

Seeing in the different viewpoint, the fact can be pointed out that the electromagnetic pulse irradiating system 1A of the second embodiment is suitable for realization of the electromagnetic pulse of a large output. The electromagnetic pulse irradiating system 1A of the present embodiment that uses the plurality of laser devices 22 can easily accomplish the electromagnetic pulse of a large output by increasing the number of laser devices 22 or increasing the output of each laser device 22.

Next, the setting of the light-condensing point 4 in the above-mentioned embodiment will be described. The light-condensing point 4 is set based on the target detection data generated by the target detecting apparatus 10. Like mentioned above, the target detection data contains data of the target 2 detected by the search, e.g. data indicating the position, speed and so on of the target 2. In one embodiment, the position of light-condensing point 4 may be set to the position of the target 2 specified by the target detection data or a position in the neighborhood of the position of the target 2. In another embodiment, a prediction position of the target 2 at a time point when the laser beam 5 is to be irradiated is calculated based on the position and speed of the target 2 specified by the target detection data, and the light-condensing point 4 may be set to the prediction position of the target 2 or a position in the neighborhood of the prediction position.

In this place, it is not necessary that the position of the set light-condensing point 4 coincides with the position of the target 2 (or, the prediction position at a time of irradiation of the laser beam 5). The electromagnetic pulse irradiating system (1, 1A) of the present embodiment generates the plasma by using the laser beam 5, and irradiates the electromagnetic pulse generated with generation of the plasma to the electronic equipment of the target 2. Therefore, it is not necessary to directly attack the target 2 with the laser beam 5. Rather, in order to generate the plasma through the breakdown of the atmosphere, the light-condensing point 4 may be set to a position that is in the neighborhood of the position of the target 2 (or the prediction position of the target 2) and different from the position of the target 2 (or the prediction position of the target 2). On the other hand, it is expected that the plasma is generated even if the laser beam 5 attacks directly to the target 2. Therefore, the light-condensing point 4 may be set to a position identical with the position of the target 2 (or the prediction position).

Also, in the above-mentioned embodiment, the plurality of light-condensing points 4 may be set according to the position of the target 2. In many cases, the resistance of the target 2 to the electromagnetic pulse depends on the incident direction of the electromagnetic pulse. For example, the target 2 of a type is vulnerable to the incidence of the electromagnetic pulse from the front direction since it has a radar device in the front section of the target 2. The target 2 of another type is vulnerable to the incidence of the electromagnetic pulse from a rear direction since the target 2 has a nozzle on the rear side. On the other hand, generally, it is not possible to know beforehand that the target 2 is vulnerable to the electromagnetic pulse from which direction.

Figure 8:
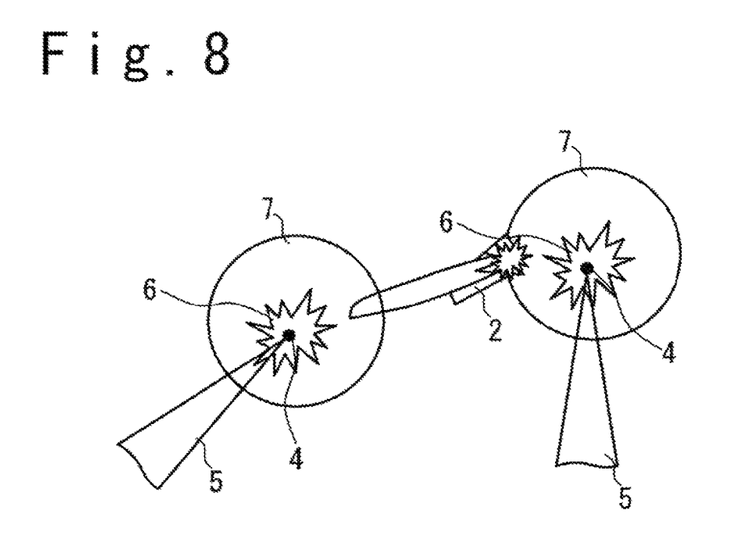
FIG. 8 is a conceptual diagram showing an example of setting of light-condensing points.

To cope with such a situation, as shown in FIG. 8, it is desirable that a plurality of light-condensing points 4 are set to the different positions to the target 2 of some position (or the prediction position), and the laser beams 5 are respectively condensed on the light-condensing points 4 to generate plasma (that is, electromagnetic pulse is generated). More strictly, when the position (or a prediction position) of the target 2 at a time point is specified, it is desirable to set a plurality of light-condensing points 4 to different positions to the position (or the prediction position) of the target 2.

The configuration in which the electromagnetic pulse irradiating system has a plurality of laser devices 22 (that is, a plurality of subsystems) is suitable to condense the laser beams 5 on the plurality of light-condensing points 4 at the same time to generate plasma, like the second embodiment. When the number of laser devices 22 is equal to the number of light-condensing points 4, the plurality of laser devices 22 may condense the laser beams 5 on corresponding ones of the light-condensing points 4, respectively. Also, when the number of laser devices 22 is more than the number of light-condensing points 4, the laser beams 5 generated from the plurality of laser devices 22 may be condensed on at least one of the plurality of light-condensing points 4 (most desirably, respectively on the plurality of light-condensing points 4).

Figure 9:
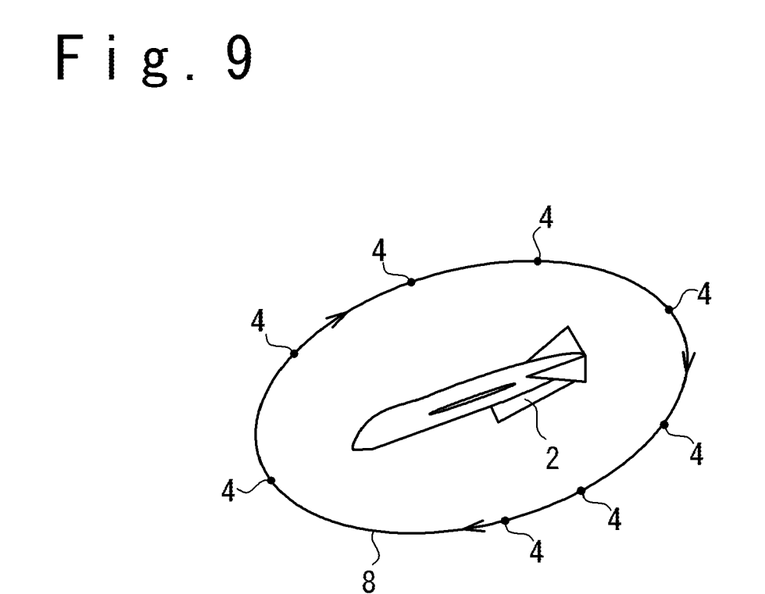
FIG. 9 is a conceptual diagram showing another example of setting of light-condensing points.

When the number of laser device 22 is single like the first embodiment, or when the number of laser devices 22 is less than the number of light-condensing points 4, the laser beam 5 is sequentially condensed on the plurality of set light-condensing points 4 to sequentially generate the plasma (i.e. generate the electromagnetic pulse). In this case, as shown in FIG. 9, when the position of the target 2 at a time point is specified, an orbit 8 is set according to the position of the target 2, the plurality of light-condensing points 4 are sequentially set around the orbit, and the laser beam 5 may be sequentially condensed on each of the set light-condensing points 4.

Various embodiments of the present invention have been described above. However, the present invention should not be interpreted to limit to the above-mentioned embodiments. It would be apparent to skilled person in the art that the present inventions could be implemented together with various changes or modifications.

The invention claimed is:

1. A method of irradiating electromagnetic pulses, comprising:

detecting a position and velocity of a target having electronic equipment, the target moving in the atmosphere;

setting a plurality of light-condensing points around the target on an orbit around the position of the target at a time point, based on the detected position and velocity of the target, wherein the plurality of light-condensing points are located at different positions from each other so as to surround the target; and sequentially irradiating, by a single laser device, a plurality of laser beams to the plurality of light-condensing points, respectively, to have an electric field strength which exceeds a breakdown electric field strength in the atmosphere when the plurality of laser beams are condensed on the plurality of light-condensing points, respectively, such that plasma is generated at each of the plurality of light-condensing points to irradiate electromagnetic pulses to the target from different directions.

2. The method according to claim 1, wherein each of the plurality of laser beams is generated through pulse oscillation.

3. The method according to claim 1, wherein the plurality of light-condensing points are set to positions which are around the target and are different from the position of the target.

4. An electromagnetic pulse irradiating system, comprising:

a target detector which detects a position and velocity of the target having electronic equipment, the target moving in the atmosphere;

a controller configured to set a plurality of light-condensing points around the target on an orbit around the position of the target at a time point, based on the detected position and velocity of the target, wherein the plurality of light-condensing points are located at different positions from each other so as to surround the target; and a single laser device configured to sequentially irradiate a plurality of laser beams to the plurality of light-condensing points, respectively, under control of the controller to have an electric field strength which exceeds a breakdown electric field strength in the atmosphere when the plurality of laser beams are condensed on the plurality of light-condensing points, respectively, such that plasma is generated at each of the plurality of light-condensing points to irradiate electromagnetic pulses to the target from different directions.

5. The electromagnetic pulse irradiating system according to claim 4, wherein the laser device generates the plurality of laser beams through pulse oscillation.

6. The electromagnetic pulse irradiating system according to claim 4, wherein the laser irradiation control device sets the plurality of light-condensing points to positions which are around the position of the target and are different from the position of the target.

7. The electromagnetic pulse irradiating system according to claim 4, further comprising a driving mechanism which, under control of the controller, drives the single laser device to turn an optical axis of the single laser device such that the optical axis sequentially passes through the plurality of light-condensing points as the plurality of laser beams are irradiated to the plurality of light-condensing points, respectively.

* * * * *